(No Model.)

L. B. YOUNG.
HANDLE ATTACHMENT.

No. 572,851. Patented Dec. 8, 1896.

WITNESSES:

INVENTOR
L. B. Young.
BY
ATTORNEYS.

UNITED STATES PATENT OFFICE.

LOY BARCLAY YOUNG, OF NEWPORT, ARKANSAS.

HANDLE ATTACHMENT.

SPECIFICATION forming part of Letters Patent No. 572,851, dated December 8, 1896.

Application filed May 12, 1896. Serial No. 591,220. (No model.)

*To all whom it may concern:*

Be it known that I, LOY BARCLAY YOUNG, of Newport, in the county of Jackson and State of Arkansas, have invented a new and Improved Handle Attachment, of which the following is a full, clear, and exact description.

The object of the invention is to provide a new and improved handle attachment which is simple and durable in construction and arranged to permit of conveniently and quickly attaching an auxiliary handle to the handle of a broom or a like article to form an extension-handle, so as to permit of using the broom for cleaning ceilings, walls, &c.

The invention consists principally of a clamp held on a stick and adapted to engage the broom-handle and a holder fixed on the stick and formed with a bearing for the broom-handle.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the views.

Figure 1:
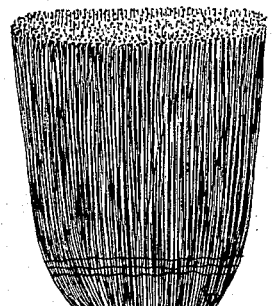
Figure 2:
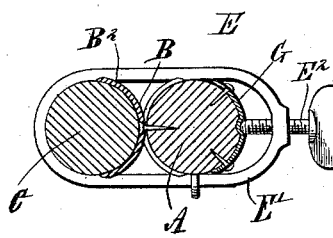
Figure 3:
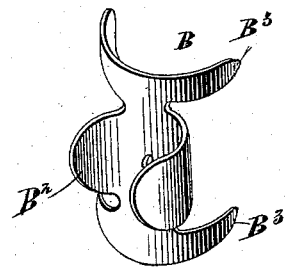

Figure 1 is a perspective view of the improvement as applied. Fig. 2 is an enlarged sectional plan view of the same on the line 2 2 of Fig. 1, and Fig. 3 is a perspective view of the holder.

On one end of the stick A are secured the holders B and B', placed a suitable distance apart and each formed with a semicircular bearing $B^2$, adapted to receive the handle C of the broom D or a like article. Between the two holders B and B' is arranged a clamp E, formed with a closed yoke E', engaging the stick A and the handle C, one side of the said yoke passing loosely through a staple F, held on the stick A. In the end of the yoke E' screws a thumb-screw $E^2$, adapted to engage with its inner end a plate G, attached to the stick A, as plainly indicated in Figs. 1 and 2. Now it will be seen that when the thumb-screw $E^2$ is in a slack position then the handle C of the broom or a like article can be readily slipped through the open end of the yoke to pass into the bearings $B^2$ of the two holders B and B'. When this has been done, then the operator screws up the thumb-screw $E^2$ to firmly draw the handle C into the bearings $B^2$, so as to securely fasten the handle C and the stick A together. In doing so an extension-handle is formed, which permits the operator to conveniently reach a ceiling, a high wall, or the like to permit of cleaning the same.

As illustrated in the drawings, each holder is formed at its ends with bearings $B^3$ for engaging the stick A, so as to securely fasten the holders in place on the stick.

Having thus described my invention, I claim as new and desire to secure by Letters Patent—

1. A device of the class described, comprising a stick, holders secured on the said stick and formed with semicircular bearings adapted to receive the handle of a broom or a like article, and a clamp held between the said holders, comprising a yoke adapted to engage the handle, and a thumb-screw screwing in the yoke and engaging the said stick, substantially as shown and described.

2. A device of the class described, provided with a holder formed with a semicircular bearing for the handle of a broom or a like article, and with like bearings extending in an opposite direction and adapted to engage a stick, in combination with a clamp, substantially as shown and described.

LOY BARCLAY YOUNG.

Witnesses:
T. D. KIMUM,
J. G. WALKER.